US010719806B1

(12) United States Patent
Riemenschneider et al.

(10) Patent No.: US 10,719,806 B1
(45) Date of Patent: Jul. 21, 2020

(54) SELF-CONTAINED, TRANSPORTABLE AND REUSABLE SYSTEM, APPARATUS AND METHOD FOR AUTOMATED SECURING AND MANAGING OF TOOLS AT JOB SITES

(71) Applicant: RNB Controls, Inc., Kingsland, TX (US)

(72) Inventors: Lee B. Riemenschneider, Austin, TX (US); James Heath Brewer, Marble Falls, TX (US); Frederick Former, Jr., Burnet, TX (US)

(73) Assignee: RNB Controls, Inc., Kingsland, TX (US)

( * ) Notice: Subject to any disclaimer, the term of this patent is extended or adjusted under 35 U.S.C. 154(b) by 0 days.

(21) Appl. No.: 16/676,912

(22) Filed: Nov. 7, 2019

Related U.S. Application Data

(60) Provisional application No. 62/844,712, filed on May 7, 2019.

(51) Int. Cl.

| | |
|---|---|
| ***G06Q 10/08*** | (2012.01) |
| ***G07C 9/28*** | (2020.01) |
| ***G07F 9/02*** | (2006.01) |
| ***B25H 3/00*** | (2006.01) |

(52) U.S. Cl.
CPC ....... *G06Q 10/087* (2013.01); *G06Q 10/0836* (2013.01); *G07C 9/28* (2020.01); *B25H 3/00* (2013.01); *G07F 9/026* (2013.01)

(58) Field of Classification Search
CPC ........ G06Q 10/087; G07F 9/026; B25H 3/00; G07C 9/28
See application file for complete search history.

(56) References Cited

U.S. PATENT DOCUMENTS

2004/0084527 A1* 5/2004 Bong .................. G06Q 10/087 235/385
2011/0140887 A1* 6/2011 Pudney ................. G06Q 10/08 340/540
2011/0178630 A1* 7/2011 Green .................... G06Q 10/08 700/214
2012/0200385 A1* 8/2012 Savage .................... B25H 3/00 340/5.7
2018/0091782 A1* 3/2018 Bashkin ............ G07C 9/00563

* cited by examiner

*Primary Examiner* — A. Hunter Wilder
(74) *Attorney, Agent, or Firm* — Hunt Pennington Kumar & Dula, PLLC

(57) ABSTRACT

A system to transport, secure and manage a set of tools at a job site may include a unitary portable tool storage building including a modified shipping container, a kiosk subsystem to perform login and authorization of personnel, an image data collection subsystem to capture image data of personnel using the kiosk, a wireless tool locating subsystem, and anti-gaming security subsystem.

16 Claims, 9 Drawing Sheets

105
170
150
155
100

SELF-CONTAINED, TRANSPORTABLE AND REUSABLE SYSTEM, APPARATUS AND METHOD FOR AUTOMATED SECURING AND MANAGING OF TOOLS AT JOB SITES

CROSS REFERENCE TO RELATED APPLICATIONS

This application is not related to other applications at the date of filing.

FIELD OF THE INVENTION

The disclosure relates to systems, apparatus and methods for transporting, securing and managing tools at job sites.

BACKGROUND OF THE INVENTION

Systems for securing and managing tools at a job site, such as a construction job site, typically include a tool shack having a dedicated office and human tool manager responsible for secure storage of tool inventory, tracking tool inventory, checking out tools to authorized personnel for use at the job site, checking in tools returned by personnel following use, tracking operating condition of tools, and arranging maintenance of the tools. The tool manager typically uses a spreadsheet or manual log book to track tool inventory, possession of checked-out tools by personnel at the job site, returns and check-in of tools from personnel back into inventory, locating missing or misplaced tools at the job site, monitoring operating condition or status of tools, maintenance schedules for the tool inventory, determining shrinkage of tool inventory, and to identify missing or inoperable tools that need to be replaced. Manual management of tool inventory by a tool manager using a spreadsheet or manual log book can be time and labor intensive, and invites a multitude of human errors and misunderstandings. Manual management of tool inventory by the tool manager is unlikely to prevent theft by dishonest employees, unauthorized and unrecorded changes of possession of tools among employees, damage to tools by misuse or lack of care, broken or damaged tools returned to inventory without notice to the tool manager, untimely repairs, untimely return of tools, misplaced tools, lost tools, theft by non-employees present at the job site, and gaps in accountability of personnel for tools and problems related to tools. Such problems are compounded by construction employees often having only a short period of employment at a local job site and lacking other meaningful connections to the contractor, that might create opportunity for accountability between the company and employees. Such problems can be further increased where certain tools are specialized and unavailable locally, or require significant lead time when it becomes necessary to replace the tools. Problems with tool inventory also can be increased where tools have an unusually high value and may attract attention of short-term employees to be stolen and sold off. Where tool inventory is not effectively controlled, need may arise for duplicate inventory of certain tools held in reserve to reduce or avoid downtime or delay of performing critical tasks, and this increase of inventory may increase capital cost invested in tools and may attract further attention of thieves among employees and non-employees having access to the job site. For reasons stated above and for other reasons which will become apparent to those skilled in the art upon reading and understanding the present specification, there is a need in the art for improved systems, apparatus and methods for securing and managing tools at job sites.

BRIEF DESCRIPTION OF THE INVENTION

The above-mentioned shortcomings, disadvantages and problems are addressed herein, as will be understood by those skilled in the art upon reading and studying the following specification. This summary is provided to introduce a selection of concepts in a simplified form that are further described below in more detail in the detailed description of embodiments. This summary is not intended to identify key or essential features of the claimed subject matter. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

In an aspect, systems, apparatus, and methods may provide or perform automated securing and managing of tool inventory at a job site that may eliminate or reduce opportunity for human error and need for manual activities.

In one aspect of this disclosure systems, apparatus and methods may be self-contained, transportable and re-usable to provide or perform automated securing and managing of tool inventory at multiple geographically remote job sites.

In an aspect systems, apparatus and methods may be self-contained, transportable and relocatable, and re-usable to provide or perform automated securing and managing of tool inventory in transport between multiple geographically remote job sites and placed into service at each job site.

Systems, apparatus and methods may be standardized and may provide or perform automated securing and managing of tool inventory under control or supervision of a remote tool wrangler, and may enable such a remote tool manager to supervise and manage tool inventory operations at multiple geographically remote job sites.

Apparatus, systems, and methods of varying scope are described herein. These aspects are indicative of various non-limiting ways in which the disclosed subject matter may be utilized, all of which are intended to be within the scope of the disclosed subject matter. In addition to the aspects and advantages described in this summary, further aspects, features, and advantages will become apparent by reference to the associated drawings, detailed description, and claims.

BRIEF DESCRIPTION OF THE DRAWINGS

The disclosed subject matter itself, as well as further objectives, and advantages thereof, will best be illustrated by reference to the following detailed description of embodiments of the device read in conjunction with the accompanying drawings, wherein.

DETAILED DESCRIPTION OF THE INVENTION

Figure 1:
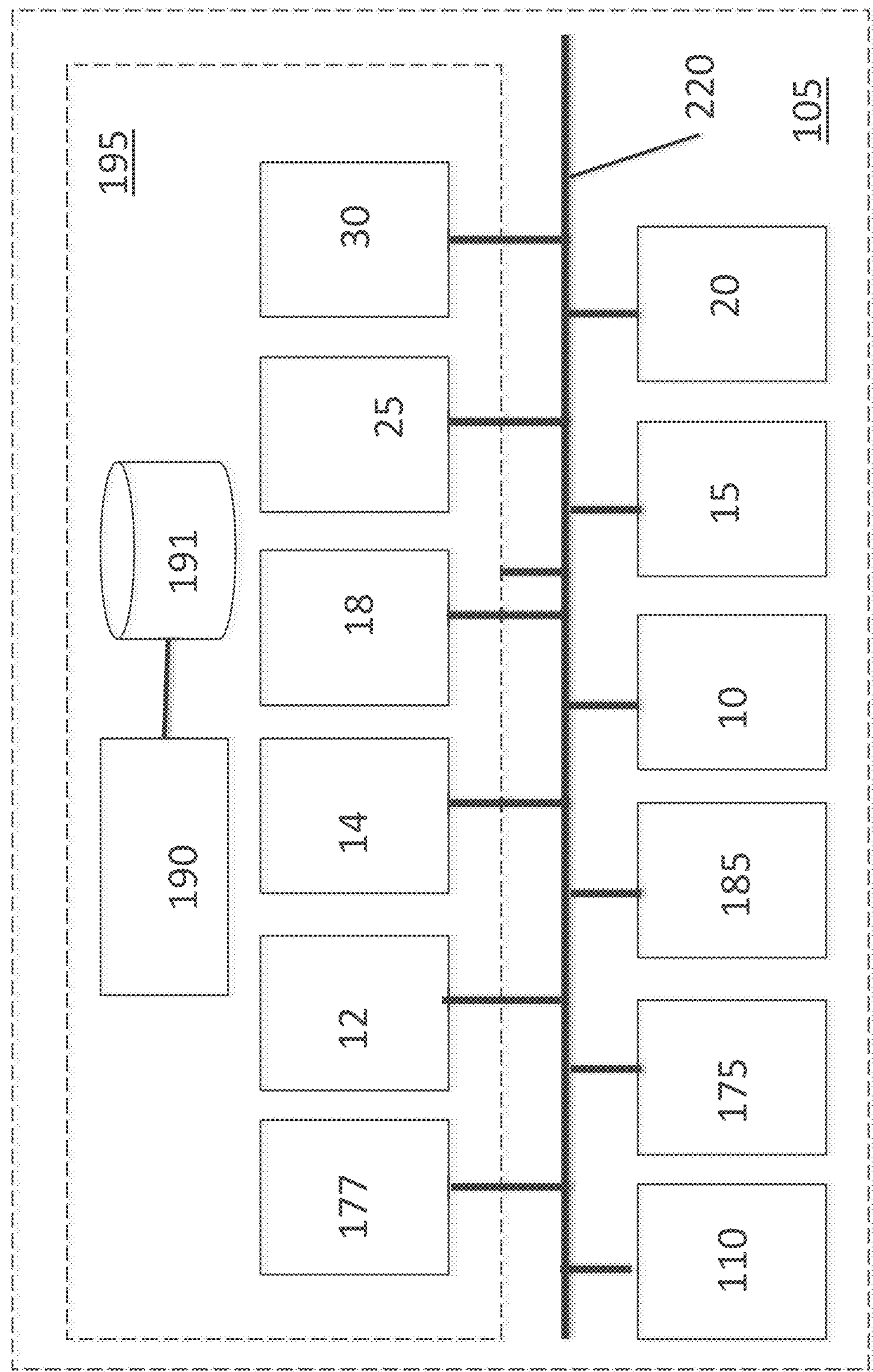
FIG. 1 is a simplified block diagram of a system 100 for securing and managing tools, according to an embodiment.

In the following detailed description, reference is made to the accompanying drawings which form a part hereof, and in which is shown by way of illustration specific embodiments which may be practiced. These embodiments are described in sufficient detail to enable those skilled in the art to practice the embodiments and disclosure. It is to be understood that other embodiments may be utilized, and that logical, mechanical, electrical, and other changes may be made without departing from the scope of the embodiments and disclosure. In view of the foregoing, the following detailed description is not to be taken as limiting the scope of the embodiments or disclosure.

The terminology used herein is for the purpose of describing particular embodiments only and is not intended to be limiting. As used herein, the singular forms "a", "an", and "the" are intended to include the plural forms as well, unless the context clearly indicates otherwise. It will be further understood that the terms "comprises" and/or "comprising" or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

It will be appreciated that for simplicity and clarity of illustration, where considered appropriate, reference numerals may be repeated among the figures to indicate corresponding or analogous elements. In addition, numerous specific details are set forth in order to provide a thorough understanding of the implementations described herein. However, it will be understood by those of ordinary skill in the art that the implementations described herein may be practiced without these specific details. In other instances, well-known methods, procedures and components have not been described in detail so as not to obscure the implementations described herein. Also, the description is not to be considered as limiting the scope of the implementations described herein.

The detailed description set forth herein in connection with the appended drawings is intended as a description of exemplary embodiments in which the presently disclosed apparatus and system can be practiced. The term "exemplary" used throughout this description means "serving as an example, instance, or illustration," and should not necessarily be construed as preferred or advantageous over other embodiments.

Illustrated in FIG. 1 is a system 100 configured to secure and manage a set of tools at a job site 101, and to transport the set of tools to a series of job sites 101. System 100 may include a relocatable, unitary portable tool storage building 105. Unitary portable tool storage building 105 may include a modified shipping container 110. Shipping container 110 may be configured to be transported between job sites 101 over a common public road, such as on a wheeled trailer chassis (not shown) configured to be pulled by a truck (not shown).

Figure 2:
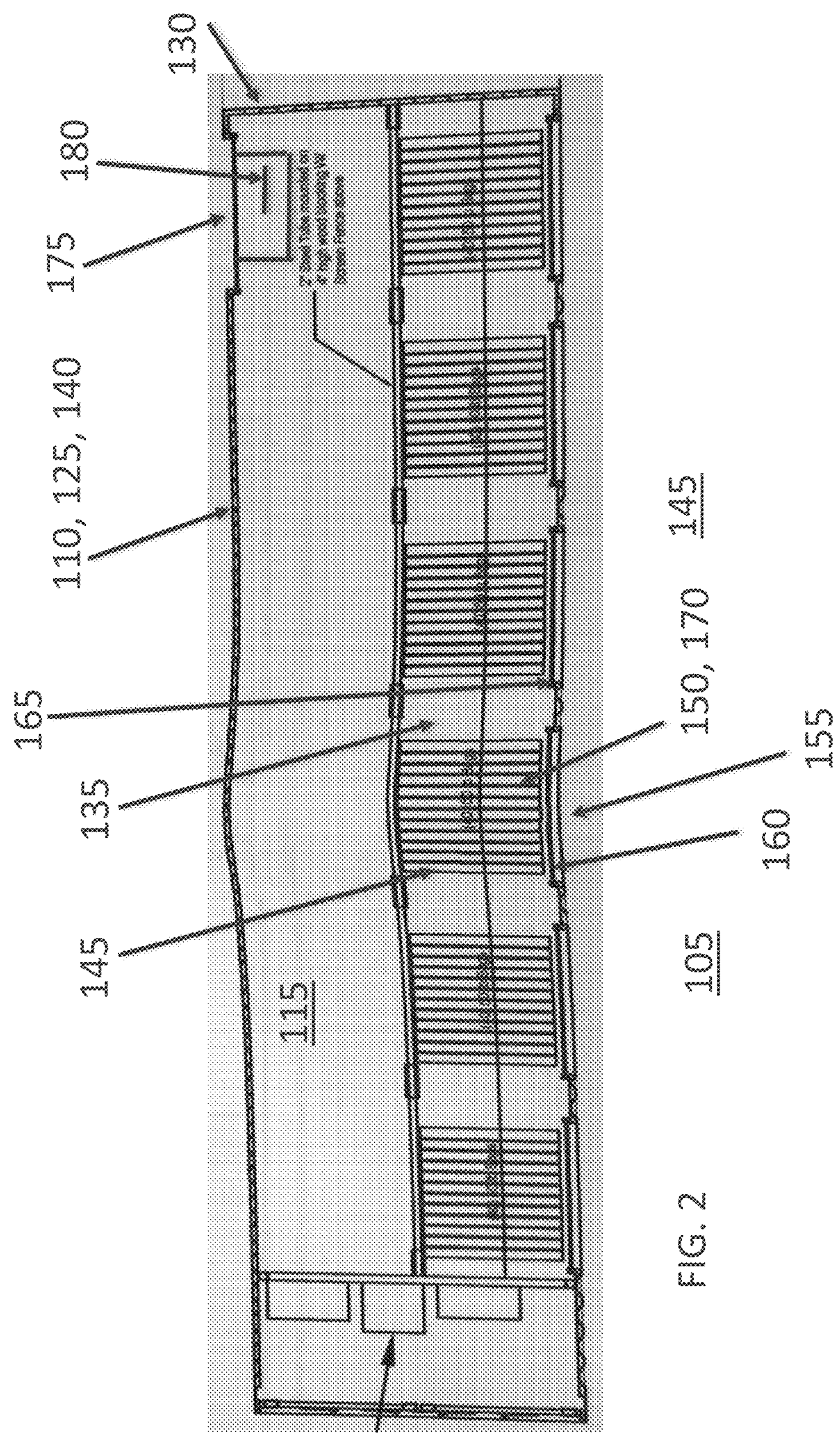
FIG. 2 is a simplified plan view of a unitary portable tool storage building 105 of system 100 for securing and managing tools, as generally shown in FIG. 1.

FIG. 2 is a simplified plan view of a unitary portable tool storage building 105 of system 100 for securing and managing tools, as generally shown in FIG. 1. As shown in FIG. 2, the unitary portable tool storage building 105 may include a container floor 115 and container top wall opposite the container floor 115. Portable tool storage building 105 may include a spaced pair of container sidewalls disposed in opposition and extending from the container floor 115 to the container top wall. The pair of container sidewalls 125 are joined in fixed integral relationship with the container floor 115 and to the container top wall at elongated major joints. Portable tool storage building 105 may include a pair of container minor ends 130 defined between the pair of container sidewalls 125, container floor 115 and container top wall, at opposite ends of the aforementioned. Portable tool storage building 105 includes a container interior 135 defined by cooperation of the container sidewalls 125, container floor 115, container top wall, and the pair of container minor end. Portable tool storage building 105 may include a container exterior 140 opposite the container interior 135. As shown in the illustrated embodiment, the container exterior 140 may be defined by cooperation of respective outer surfaces of the pair of container sidewalls 125, container floor 115, container top wall, and the pair of container minor ends 130. The container exterior 140 faces the external environment 145 located outside the portable tool storage building 105 at jobsite 101.

Referring to FIG. 2, portable tool storage building 105 may include a plurality of tool bay dividers 145 subdividing the container interior 135. Cooperation of the plurality of tool bay dividers 145 defines a plurality of tool bays 150. Portable tool storage building 105 may include a plurality of tool bay door portals 155 defined in at least one of the container sidewalls 125*a*, 125*b* and container minor ends 103*a*, 130*b*. Each tool bay door portal 155 may define a corresponding tool bay access control point aligned with a corresponding one of the plurality of tool bays 150 to provide a single route of entry and egress by authorized personnel between the external environment 145 and the corresponding one of plurality of tool bays 150. Portable tool storage building 105 may include a plurality of tool bay doors 160 corresponding to the tool bay door portals 155. Each tool bay door 160 is supported for access control movement relative to a corresponding tool bay door portal 155 between an open position and a closed position. In the open position, the tool bay door 160 allows access to the corresponding tool bay 150 from the external environment 145 through the corresponding tool bay door portal 155. In the closed position, the tool bay door 160 prevents access to the corresponding tool bay 150 from the external environment 145 through the corresponding tool bay door portal 155. Portable tool storage building 105 may include a plurality of door access control mechanisms 165 corresponding to the tool bay doors 160. Each door access control mechanism 165 may be configured to selectively control the access control movement of a corresponding tool bay door 160 between the closed position and open position.

As shown in FIG. 2, portable tool storage building 105 may include each of the tool bays 150 being further subdivided to provide a plurality of tool storage locations 170. Each of the plurality of tool storage locations 170 may be configured to store a corresponding one of the plurality of tools included in the set of tools. During regular operation of system 100, each tool storage location 170 is accessible from a corresponding one tool bay door portal 155 that defines a corresponding tool bay access control point aligned to provide a single route of entry and egress to the one corresponding tool bay 150 that includes the same tool storage location 170.

Referring to FIG. 2, system 100 may include a self-service kiosk subsystem 175 mounted in the modified shipping container 110. The kiosk subsystem 175 may include a display 180 configured to display access information to personnel accessing the kiosk subsystem 175. Referring to FIG. 1, system 100 may include an image data collection subsystem 185 configured to receive and capture image data of personnel accessing the kiosk subsystem 175 to request temporary exclusive authorization to access and take, or replace, selected or pre-determined tools for use in performing projects (not shown) at the job site. In embodiments, image data collection subsystem 185 may capture image data and may include at least one security camera trained on the location of the face of personnel accessing the kiosk subsystem 175 when viewing the display 180 to providing personnel identification information and request authorization by the kiosk subsystem 175. The security camera may be configured to capture a photograph or video image of the personnel, such as a photograph of the face of the personnel. The image data collection subsystem 185 also may be configured to capture secondary identification data of personnel accessing kiosk subsystem 175, in addition to the facial image data of the personnel, for simultaneous reference when at least one processor 190 (hereinafter "processor") of a computing system 195 performs a kiosk authorization module 177 for personnel requesting authorization via the kiosk subsystem 175 to access tools securely stored in the portable tool storage building 105. As shown in FIG. 1, computing system 195 may include processor 190 operably coupled to accessible memory 191 associated therewith. Processor 190 is operable to perform executable instructions, such as instructions embodied in software. Kiosk subsystem 175 may include a kiosk authorization module 176. The system 100 may include processor 190 configured to perform login and authorization operations of kiosk authorization module 177 in relation to personnel lacking and seeking authorization to the tool bays 150, to perform authorized tool bay access operations to remove or replace tools for a project. In some embodiments, the image data collection subsystem 185 may include a data input device to provide data for processing by processor 190 performing instructions according to the authorization algorithm of the kiosk authorization module 177. It will be understood that in some embodiments, the image data collection subsystem 185 also may include a secondary data input device other than said image data input device. In some embodiments, the image data collection system 185 may include the image data input device, such as security camera, additionally configured to capture personnel identification card data. In some embodiments, the either the image data collection subsystem 185 or kiosk subsystem 175 may capture and input secondary identification data of the personnel, which may include personnel identification card data. In some embodiments, the kiosk subsystem 175 may include secondary identification data comprising manual entry personnel credentials data. In some embodiments, system 100 may include a photo cell or sensor, such as a load transducer, configured to detect presence of personnel at the kiosk subsystem 175.

In some embodiments, processor 190 may be configured to issue exclusive authorization to identified authorized personnel, responsive to usage of the kiosk subsystem 175 by the personnel to gain issuance of authorization, to access at least one tool storage location 170 to remove at least one pre-identified tool. In some embodiments, processor 190 may be configured to issue exclusive authorization to identified authorized personnel to access at least one tool storage location 170 to remove at least one pre-identified tool, and configured to perform an automated real-time audit of all tool storage locations 170. In some embodiments, processor 190 may be configured to perform the automated real-time audit before issuing authorization to authorized personnel to depart from the tool storage building 115. In some embodiments, processor 190 may be configured to issue exclusive authorization to identified authorized personnel to access at least one tool storage location 170 to remove at least one pre-identified tool, and may be configured to perform an automated real-time audit of location of all tools. In some embodiments, processor 190 may be configured to perform the automated real-time audit before issuing authorization to authorized personnel to depart from said tool storage building 115. In some embodiments, processor 150 may be configured to report the automated real-time audit to supervisory personnel to prompt intervention before the authorized personnel is issued release authorization to depart from the tool storage building.

In some embodiments, processor 190 may be configured to control access to a tool storage location 170 in relation to a tool pick list to produce accountability of authorized personnel for removal of all tools on the tool pick list and any other tools removed without authorization during an authorized access period. In some embodiments, a tool bay door sensor may be configured to provide an open signal when a corresponding tool bay door 165 is positioned other than in the closed position. In some embodiments, a tool bay door timer may be configured to cause a tool bay door 165 to move from open position to closed position. In some embodiments, processor 190 may be configured, responsive to a real-time audit of the set of tools, to provide a control signal to cause a tool bay door 165 to move from a first position to a second position. In the arrangement shown in FIG. 1, the control signal may be provided to a door access control mechanism.

Referring to FIG. 1, system 100 may include a distributed wireless tool locating subsystem 10. Wireless tool locating subsystem 10 may include a tool locating module 12 including a tool locating algorithm executed by processor 190 to perform tool locating operations. Wireless tool locating subsystem 10 may include a tool inventory module 14 including a tool inventory algorithm executed by processor 190 to perform tool auditing operations. In some embodiments, processor 190 may be configured to control access to the plurality of tool storage locations 170 to provide a real-time audit determining all tools removed from any tool storage locations 170 accessible to the authorized personnel during an authorized access period immediately preceding the real-time audit. In some embodiments, processor 190 may be configured to perform a real-time audit of all tools to determine the locations, presence or absence of any or all tools removed from, or returned to, the plurality of tool storage locations 170 or elsewhere at the jobsite, where any of the tools were made accessible to authorized personnel during an authorized access period immediately preceding the real-time audit. In some embodiments, wireless tool locating subsystem 10 by processor 190 may be configured to perform a real-time audit of all tools to determine the location, presence, or absence of any or all tools within a designated wireless communications area 103. It will be understood that the wireless communications area 103, for example, may coincide with the portable tool storage building 105, the jobsite, or at least one geofenced area. In some embodiments, for example, a wireless communications tool locating subsystem 10 may utilize or control a wireless communication transceiver 15. Wireless communication transceiver 15 may be configured to send and receive wireless communications according to a suitable wireless protocol, via a suitable wireless communications mode, throughout the wireless communications area. Wireless communication transceiver 15 may be configured to access a wireless protocol stack 25 embodied in instructions of a protocol algorithm executable by processor 190 to encode and decode wireless communications according to such wireless protocol. In some embodiments, for example, the wireless communications transceiver 15 may operate to send and receive communications encoded according to a suitable wireless communications protocol, via a suitable wireless communications mode. These may include: radio frequency (RF), Zigbee, Bluetooth, wireless fidelity (Wi-Fi) or IEEE 802.11, infrared, GPS, satellite or cellular. In some embodiments, for example, a wireless communications tool locating subsystem 10 may access or control a wireless communication transceiver 15 configured to send and receive wireless communications throughout the wireless communications area. It will be understood that the wireless communications area may be established by configuring the wireless communication transceiver 15 to provide a particular wireless communications coverage area, such as by, for example, controlling transceiver antenna configuration or length.

Referring to FIG. 1, system 100 may include a plurality of wireless tool identifiers 20 or tags each associated with or mounted on a corresponding one of the plurality of tools to uniquely identify each such tool. The plurality of wireless tool identifiers 20 may include, for example, a plurality of wireless RFID tags each associated with or mounted on corresponding of the plurality of tools to uniquely identify each such tool. It will be understood that RFID tags may be powered, active RFID devices or passive RFID devices. In some embodiments, such wireless tool identifiers 20 may include BLE (Bluetooth low energy) or GPS chip tags. In some embodiments, processor 190 may be configured to access geofence information in relation to any or all of the plurality of tools, such as provided by geofence tags associated with each of the plurality of tools, and/or geofence beacons which may cooperate or may communicate with or detect the geofence tags. In some embodiments, the wireless tool identifiers 20 may include geofence tags, which may be RFID geofence tags, and which may be in communication with, or may be identified by geofence beacons, which may be RFID readers or transceivers. In some embodiments, system 100 thus may include a plurality of wireless tool identifiers 20 which are wireless identification sources associated with and affixed to corresponding each one of the set of tools. The plurality of wireless identifiers or sources 20 each may be configured to provide wireless tool identification data associated with said corresponding each one of said set of tools over the suitable wireless communication mode, such as RF. One or a plurality of wireless transceivers 15 may be configured to process the wireless tool identification data.

In some embodiments, wireless tool locating subsystem 10 may include the tool inventory module 14 including a tool inventory algorithm executed by processor 190 to perform tool auditing operations, which includes performing a real-time audit of all tools to determine the presence or absence of any or all tools removed from, or returned to, the tool storage locations 170 (shown in FIG. 1) or located elsewhere at the job site 101. In some embodiments, processor 190 may be configured to selectively control access to the plurality of tool storage locations 170 to provide a real-time audit of all tools to determine the presence or absence of any or all tools removed from, or returned to, the tool storage locations 170 through a tool bay door portal during the period the identified authorized personnel is issued exclusive authorization to remove pre-identified tools, or located elsewhere at the job site 101. In some embodiments, processor 190 may be configured to selectively control access to plural of said tool storage locations to provide a real-time audit of all tools to determine the presence or absence of any or all tools removed from, or returned to, the tool storage locations 170, and all tools moved from a resting position in any tool storage locations, during the period the identified authorized personnel is issued exclusive authorization to remove pre-identified tools.

In some embodiments, processor 190 (FIG. 1) may be configured to perform any of the following:

receiving captured image data of personnel from the image data input device, processing captured image data of personnel received from the image data input device, receiving personnel credentials data input from the data input device of the kiosk subsystem, accessing a data storage that includes personnel identification data, retrieving from data storage personnel identification data in relation to at least one of the captured image data and the personnel credentials data input or personnel manual entry identification data, verifying identity of personnel using the kiosk subsystem based on processing the captured image data and personnel credentials data input, outputting system usage information to the display, performing tool access rules in relation to identity of authorized personnel, determining authorization for personnel to access tools in relation to performing the tool access rules such as tool access rules for a project, generating access control instructions to cause operation of the plurality of door access control mechanisms to provide authorized access to tool storage locations, performing on the fly tool, real-time tool audit or inventory calculations, performing on the fly tool, real-time tool location audits;

generating reports of tool locations and status for all tools in the set of tools;

generating tool return prompts to personnel.

As shown in FIG. 1, system 100 may include an anti-gaming security subsystem 30 configured to establish a security perimeter 19, and detect presence within the security perimeter 19, about the portable tool storage building 105 of an unauthorized person other than the single, individual personnel for whom access authorization is determined by the kiosk subsystem 175. In some embodiments, anti-gaming security subsystem 30 may access the image data collection subsystem 185, which may include at least one security camera trained on a field of view suitable to detect unauthorized persons entering or inside the security perimeter 19. In some embodiments, the anti-gaming security subsystem 30 may include processor 190 configured to execute instructions to perform an anti-gaming security algorithm. The anti-gaming security subsystem 30 may include processor 190 configured to provide an audible access termination warning over an external loudspeaker responsive to detecting an unauthorized person within the security perimeter. In some embodiments, the anti-gaming security subsystem 30 may include processor 190 configured to terminate access of the authorized personnel, responsive to an access termination condition being satisfied. Such an access termination condition may include, for example, unauthorized personnel remaining within the security perimeter or taking possession of a tool. In some embodiments, the anti-gaming security subsystem 30 may include processor 190 configured in terminating access to control at least one of the door access control mechanisms 165 to maintain all of the plurality of tool bay doors 165 in closed position. In some embodiments, the anti-gaming security subsystem 30 may include processor 190 configured in terminating access to control at least one of the door access control mechanisms 165 to move any, or at least one, of the tool bay doors 165 from open position to closed position. In some embodiments, anti-gaming security subsystem 30 may access at least one security camera trained on each of the plurality of tool bays 150 to record video data of tools in possession of authorized personnel accessing each of the plurality of tool bays 150. The at least one security camera 35 also may capture and record video data that, when processed by the anti-gaming security subsystem 30 determines or confirms that tools are in possession of unauthorized personnel accessing tool bays 150 without authorization. In some embodiments, anti-gaming subsystem system 30 may include processor 190 configured to access at least one security camera trained on each of the plurality of tool storage locations 170, such as tool storage compartments 175, to record video data of tools in the tool storage locations 170 that, when processed by the anti-gaming security subsystem 30 determines or confirms that tools are in possession of personnel accessing the tool storage locations 170 to remove or replace tools.

Figure 3:
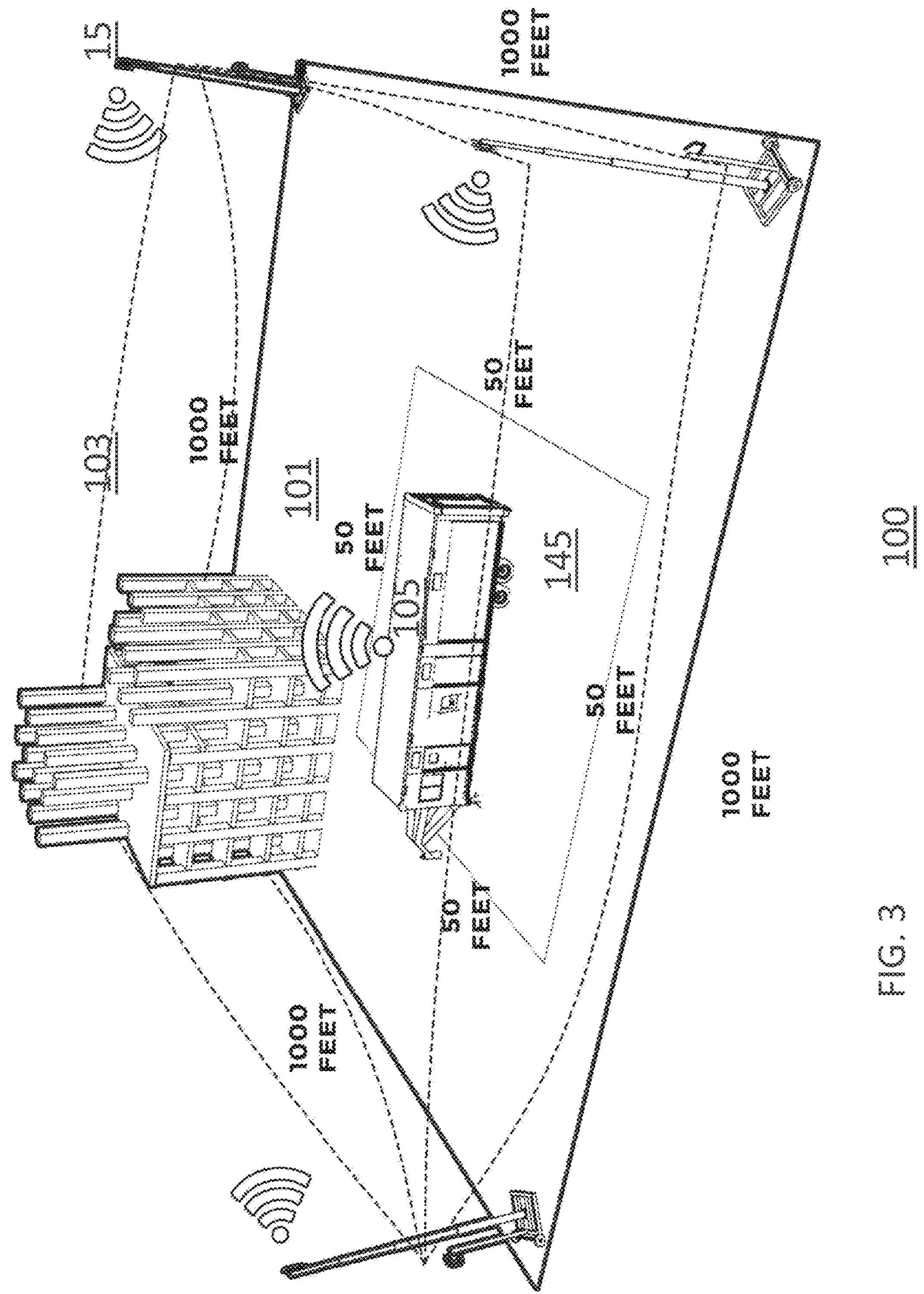
FIG. 3 is a simplified perspective view of system 100 for securing and managing tools, shown in FIG. 1.

FIG. 3 is a simplified perspective view of system 100 for securing and managing tools. As shown in FIG. 3, portable tool storage building 105 may be located at jobsite 101 for transporting, securing and managing inventory of a set of tools (not shown in FIG. 3). System 100 may include a distributed wireless tool locating subsystem 10. Wireless tool locating subsystem 10 may include a plurality of wireless transceivers 15 in communication with a plurality of wireless tool identifiers (not shown in FIG. 3) associated with the set of tools.

Figure 4:
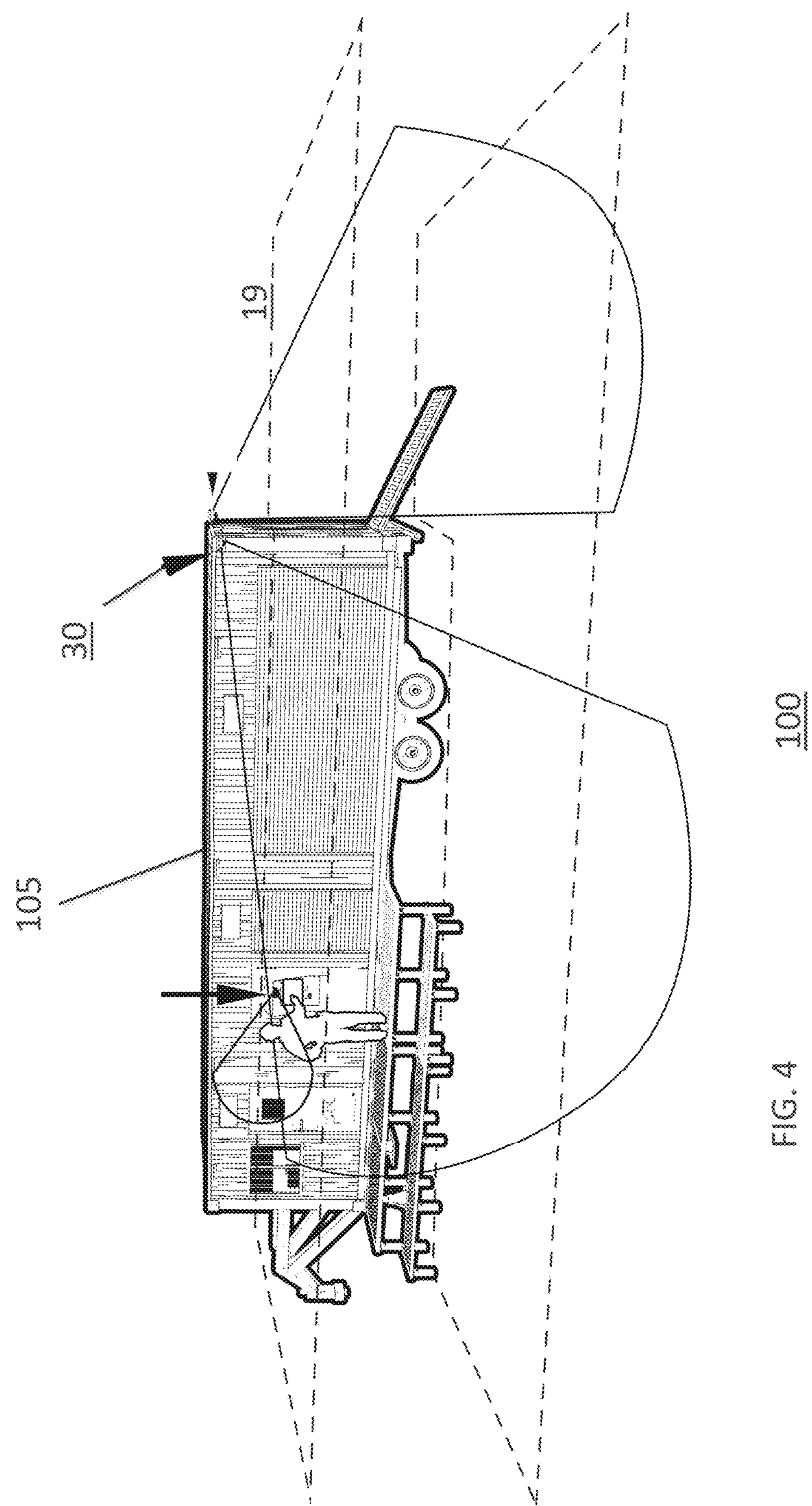
FIG. 4 is a simplified partial perspective view of system 100 for securing and managing tools, shown generally in FIG. 3.

FIG. 4 is a simplified partial perspective view of system 100 for securing and managing tools, shown generally in FIG. 3. As shown in FIG. 4, system 100 may include an anti-gaming security subsystem 30 defining a security perimeter 19 around the portable tool storage building 105 and configured to detect presence of persons within the security perimeter 19.

Figure 5:
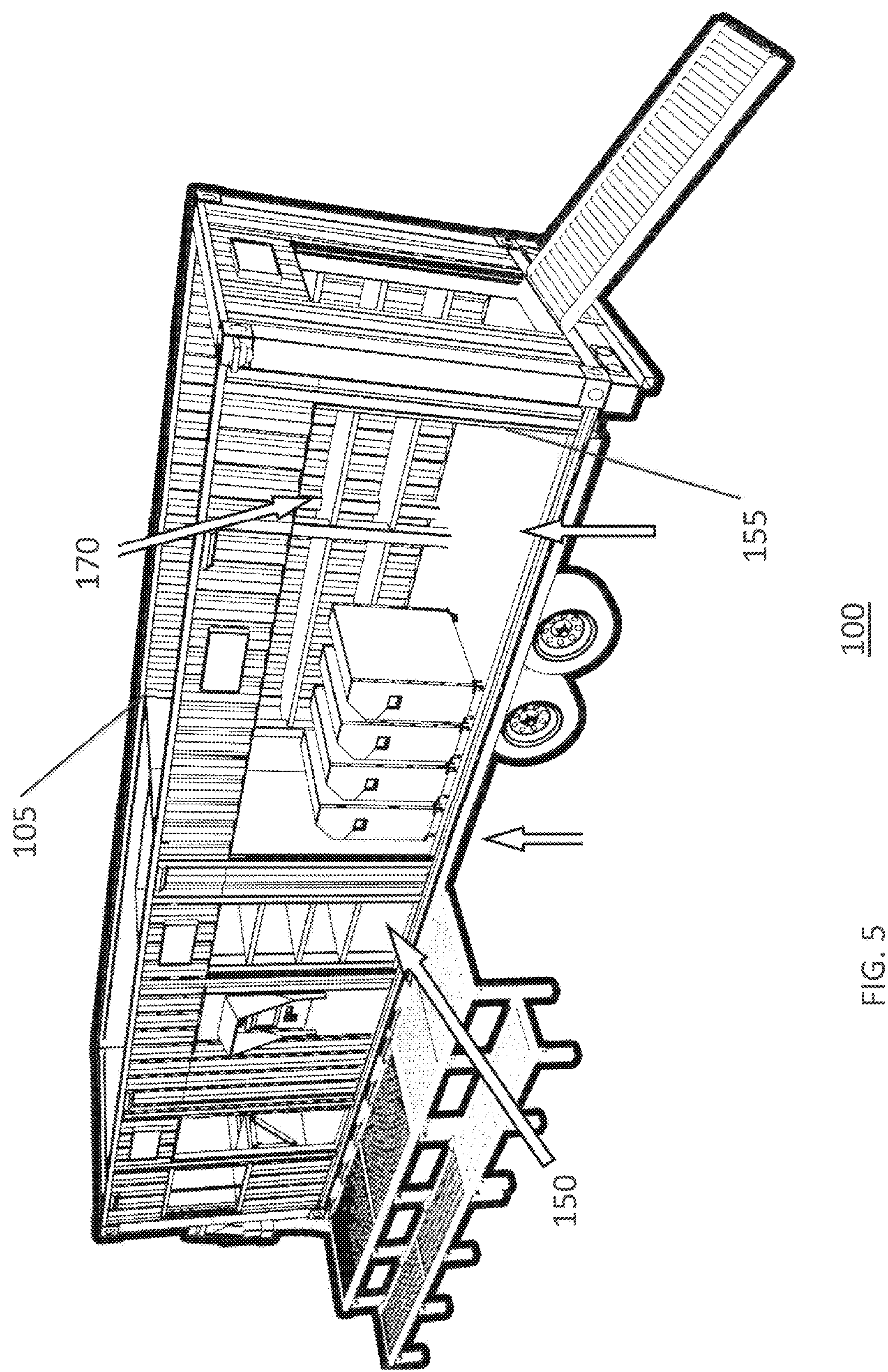
FIG. 5 is a simplified partial perspective view of system 100 for securing and managing tools as shown generally in FIG. 4, with the roof omitted and open to show interior details.

FIG. 5 is a simplified partial perspective view of system 100 for securing and managing tools as shown generally in FIG. 4, showing the portable tool storage building 102 with roof omitted and tool bay doors 165 open to show interior details.

Figure 6:
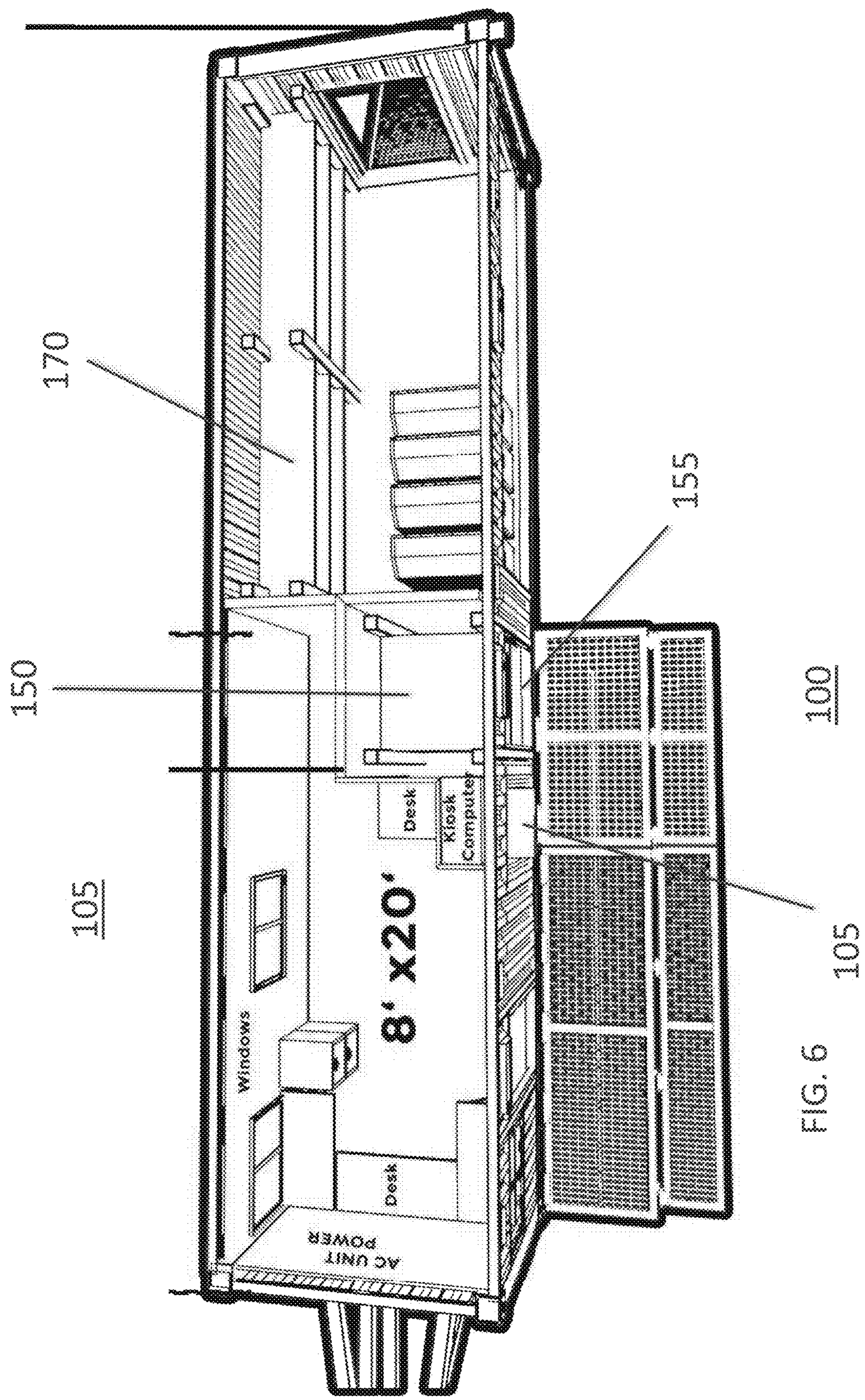
FIG. 6 is a simplified partial top view of system 100 for securing and managing tools as shown generally in FIG. 5, with the roof omitted and showing interior details.

FIG. 6 is a simplified partial top view of system 100 for securing and managing tools as shown generally in FIG. 5, showing the portable tool storage building 102 with roof omitted and tool bay doors 165 open to show interior details.

Figure 7:
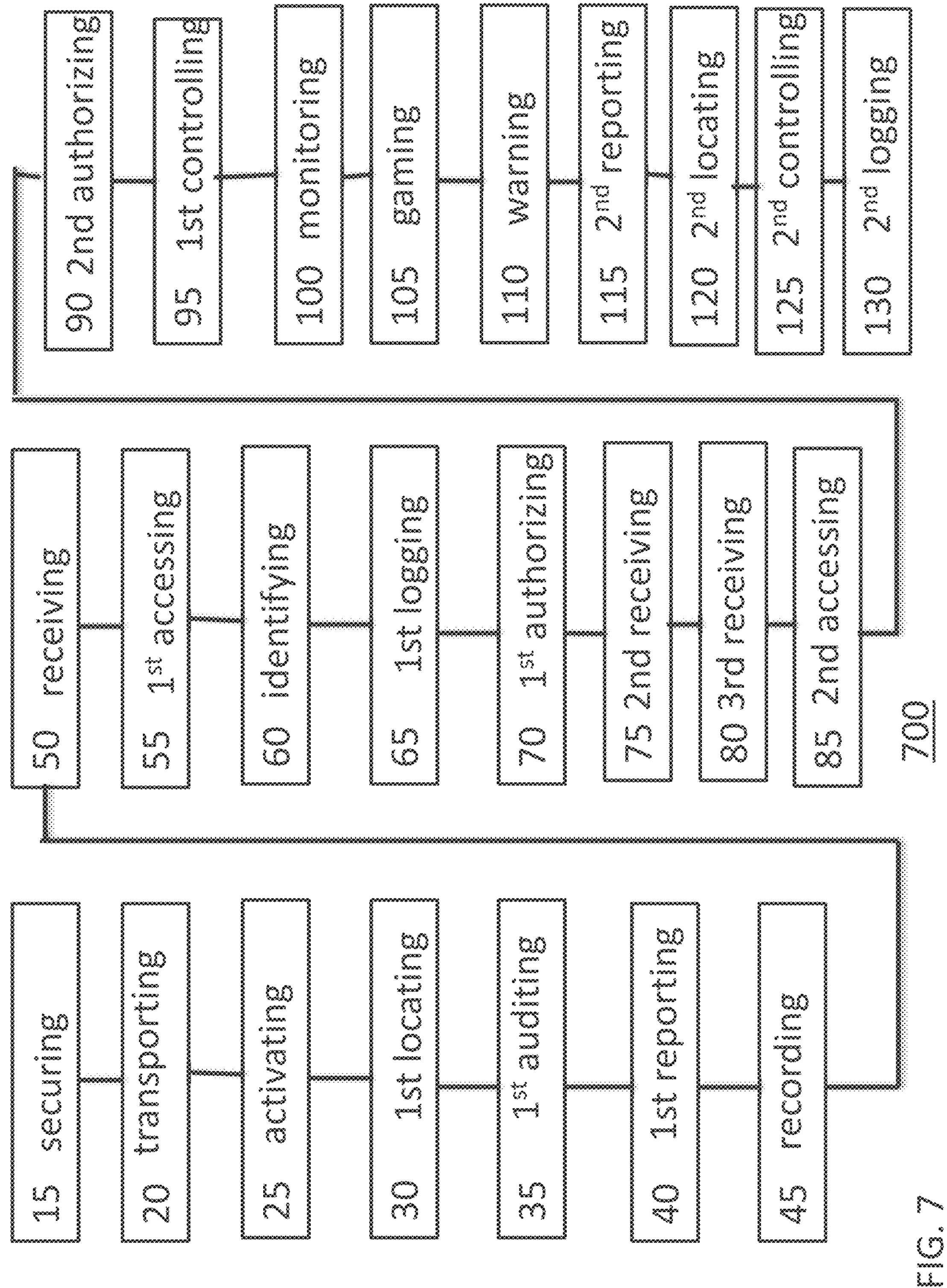
FIG. 7 is a flow diagram showing method 700 for transporting, securing and managing a set of tools at a job site.

FIG. 7 is a flow diagram showing method 700 for transporting, securing and managing a set of tools at a job site. Method 700 may be performed by operations of a system 100 for securing and managing tools, as described elsewhere in this disclosure. Method 700 may include securing 15 a set of tools in a portable tool storage building configured for transportation. Method 700 may include transporting 20 the portable tool storage building over a common public road from a first location or previous jobsite to a next active jobsite. Method 700 may include activating 25 a secure tool management system in relation to the set of tools in the portable tool storage building at the jobsite. It will be understood that the secure tool management system may be identical to system 100 for secure management of a set of tools, which is described elsewhere herein. It will be understood that activating 25 the secure tool management system may include activating a processor thereof. It will be understood that the processor of such secure tool management system may be identical to processor 190 of system 100 for secure management of a set of tools, which is described elsewhere herein. Method 700 may include the processor performing first locating 30 each of the plurality of tools in the set of tools. Method 700 may include the processor performing first auditing 35 the plurality of tools by locations determined in the first locating 30, such as by performing an automatic count of the plurality of tools by location of each tool in the set. Method 700 may include the processor performing first reporting 40 the first auditing 35 in a management report. Method 700 may include the processor performing first recording 45 a facial visual image data, such as facial photograph data, of the face of an employee using the kiosk subsystem. Method 700 may include the processor receiving 50 employee identification data input received by the kiosk subsystem, such as identification card data or manual entry identification data, for the employee using the kiosk subsystem to request authorization for accessing one or more of the tool bays for checking out one of more tools for performing a project at the jobsite. Method 700 may include the processor performing first accessing 55 of a data store including employee identification information and employee photograph or visual image data. Method 700 may include the processor performing identifying 60 the employee using the kiosk subsystem by comparing the employee identification data input to employee identification information recorded in the data store. Identifying 60 also may include facial image identifying of the employee using the kiosk subsystem, by comparing the facial visual image data of the employee using the kiosk subsystem with facial visual image data of employees recorded in the data store. Method 700 may include the processor performing first logging 65 the employee identification data input, facial visual image data input recorded by a camera trained on the user area of the kiosk subsystem of an employee using the kiosk subsystem and providing the employee identification data input, time, and result of first authorizing 70. Method 700 may include the processor performing first authorizing 70, to grant or deny authorization, to the employee using the kiosk subsystem based upon the identifying 60.

Method 700 may include the processor performing second receiving 75 of project data input received by the kiosk subsystem. The project identifier data input may include project identifier data input received by the kiosk subsystem from the employee using the kiosk subsystem and granted authorization in first authorizing 70. Method 700 may include the processor performing third receiving 80 of tool identifier data input by the kiosk subsystem. The tool identifier data input may include tool identifier data input received by the kiosk subsystem from the employee using the kiosk subsystem and granted authorization in first authorizing 70, where the employee seeks access to remove one or more tools identified by the tool identifier data input for using the identified tools to perform the project identified by the project identifier data input received by the kiosk subsystem subsequent to the first authorizing 70. Method 700 may include the processor performing second accessing 85 of project identifier data and tool identifier data recorded in the data store, for comparison to the project identifier data input received by the kiosk subsystem in the second receiving 75 and to the tool identifier data input received by the kiosk subsystem in the third receiving 80. Method 700 may include the processor performing second authorizing 90 of the employee to be granted or denied tool bay access to the identified tools for the identified project. Second authorizing 90 may include the processor performing comparison of the project identifier data input and tool identifier data input with recorded project identifier data in the data store, and with recorded tool identifier data in the data store, to determine whether or not the employee is authorized to receive a grant of access to the one or more tool bays to retrieve tools, or to check-in and replace tools, based upon the comparison of the project identifier data input and recorded project identifier data, and based upon the comparison of the tool identifier data input and recorded tool identifier data for the same, corresponding recorded project identifier data.

Referring to FIG. 7, method 700 may include the processor performing first controlling 95 of the door activation mechanisms to operate and open one or more tool bay doors to provide access to corresponding tool bays each having a corresponding one or more tools located therein, to be retrieved by the employee using the system and granted authorization by the second authorizing 90 to take and use identified tools corresponding to the tool identifier data input for use in performing the identified project corresponding to the project identifier data input. Method 700 may include the processor performing monitoring 100 of the security perimeter and portable tool storage building to ensure that only the authorized employee access the tool bays, and to terminate access where an unauthorized employee or person enters the security perimeter or portable tool storage building. Method 700 may include the processor performing gaming 105 (anti-gaming) action to determine and terminate access where an unauthorized employee or person enters the security perimeter or portable tool storage building, which may include video recording, closing and locking the tool bay doors by operating the door activation mechanisms, issuing reports and calls to managers or security personnel, and by issuing audible warnings. Method 700 may include the processor performing warning 110 instructing the authorized employee to stop an unauthorized employee or person from entering the security perimeter or taking possession of tools, or instructing the authorized employee to replace tools which are not authorized to be removed for use on the identified project, or to terminate suspected gaming actions relative to the secure tool management system. Method 700 may include the processor performing second reporting 115 of a report to management wireless devices to inform managers of activities by the authorized employee and occurring during the authorized employee's period of authorized access to the tool bays, the location of related tools, and suspected gaming of the system. Method 700 may include the processor performing second locating 120 of the plurality of tools in the set, at the jobsite. Method 700 may include the processor performing second controlling 125 access to the tool bays by controlling the door activation mechanisms to selectively open and close tool bay doors and thereby to grant or deny physical access to tools in the tool bays for the authorized employee. Method 700 may include the processor performing second logging 130 of tool identifiers and locations of tools removed by the authorized employee or unauthorized employees or persons, such as by video logging in combination with reports of tool locations and counts of the set of tools.

Figure 8:
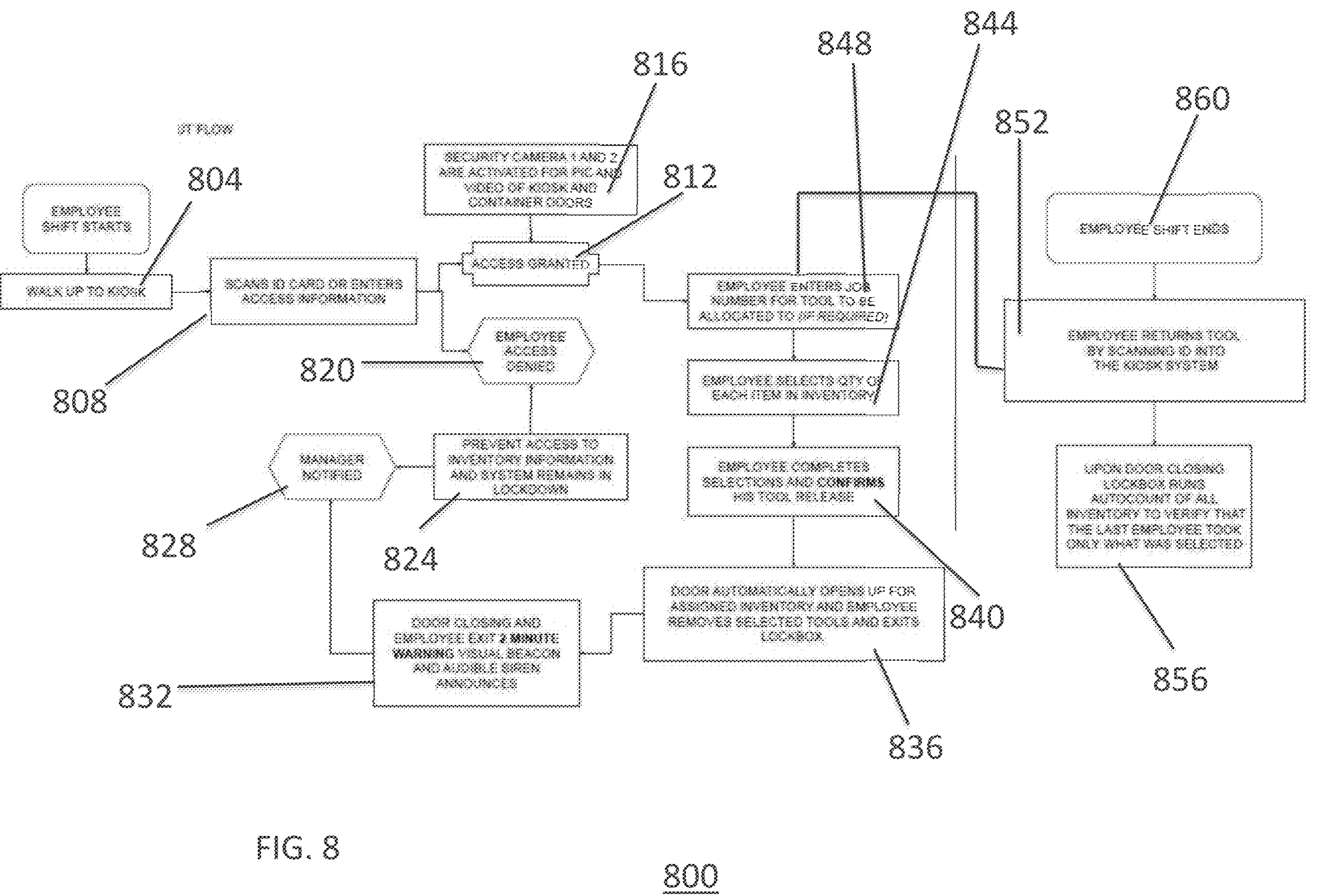
FIG. 8 is a flow diagram showing method 800 for transporting, securing and managing a set of tools at a job site.

FIG. 8 is a flow diagram showing method 800 for transporting, securing and managing a set of tools at a job site. Method 800 may be identical to method 700 described hereinabove, except as otherwise described in this paragraph or shown in FIG. 8.

Figure 9:
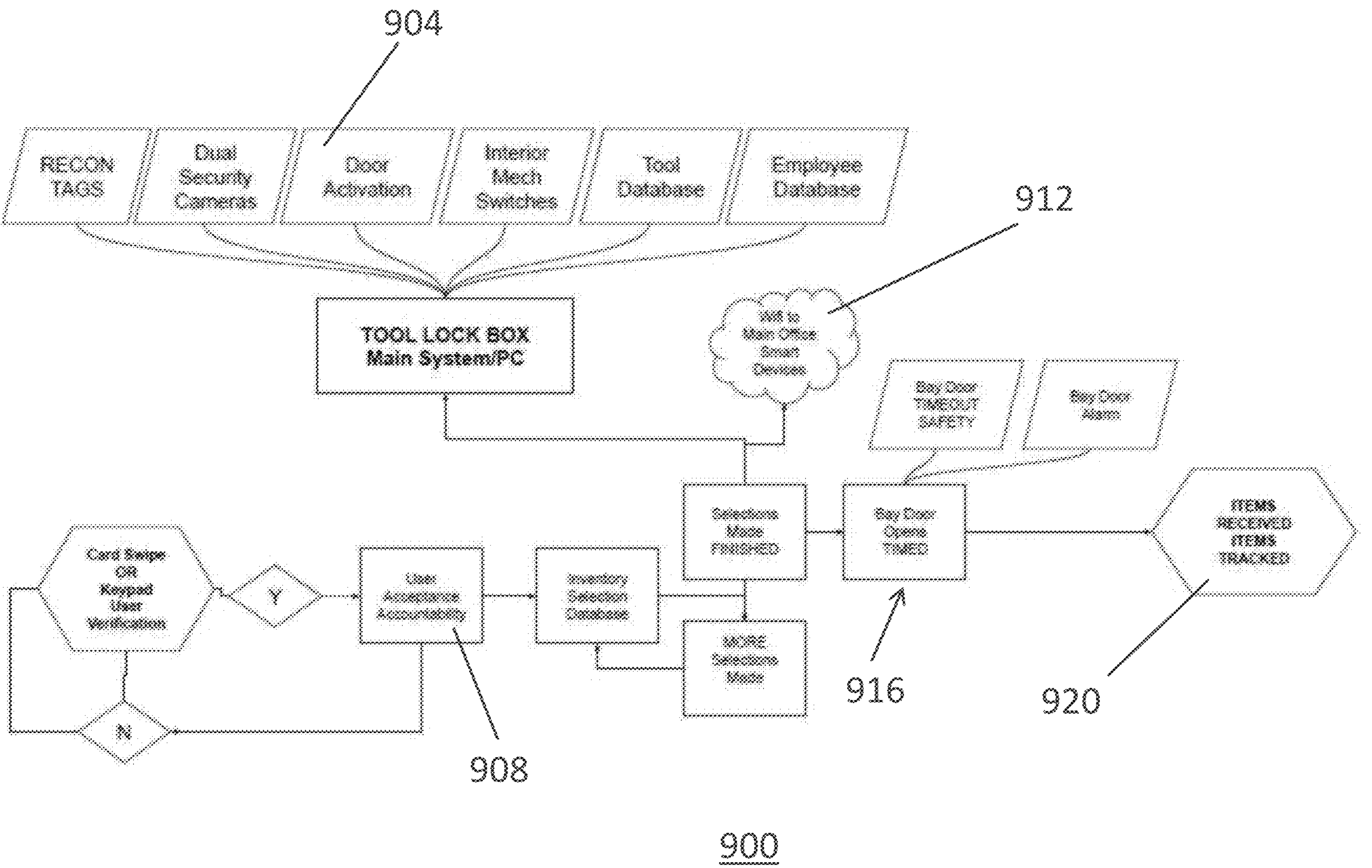
FIG. 9 is a flow diagram showing method 900 for transporting, securing and managing a set of tools at a job site.

FIG. 9 is a flow diagram showing method 900 for transporting, securing and managing a set of tools at a job site. Method 900 may be identical to method 700 described hereinabove, except as otherwise described in this paragraph or shown in FIG. 8.

Apparatus, methods and systems according to embodiments of the disclosure are described. Although specific embodiments are illustrated and described herein, it will be appreciated by those of ordinary skill in the art that any arrangement which is calculated to achieve the same purposes can be substituted for the specific embodiments shown. This application is intended to cover any adaptations or variations of the embodiments and disclosure. For example, although described in terminology and terms common to the field of art, exemplary embodiments, systems, methods and apparatus described herein, one of ordinary skill in the art will appreciate that implementations can be made for other fields of art, systems, apparatus or methods that provide the required functions. The invention should therefore not be limited by the above described embodiment, method, and examples, but by all embodiments and methods within the scope and spirit of the invention. In particular, one of ordinary skill in the art will readily appreciate that the names of the methods and apparatus are not intended to limit embodiments or the disclosure. Furthermore, additional methods, steps, and apparatus can be added to the components, functions can be rearranged among the components, and new components to correspond to future enhancements and physical devices used in embodiments can be introduced without departing from the scope of embodiments and the disclosure. One of skill in the art will readily recognize that embodiments are applicable to future systems, future apparatus, future methods, and different materials. All methods described herein can be performed in a suitable order unless otherwise indicated herein or otherwise clearly contradicted by context. The use of any and all examples, or exemplary language (e.g., "such as"), is intended merely to better illustrate the disclosure and does not pose a limitation on the scope of the disclosure unless otherwise claimed. No language in the specification should be construed as indicating any non-claimed element as essential to the practice of the disclosure as used herein. Terminology used in the present disclosure is intended to include all environments and alternate technologies that provide the same functionality described herein.

What is claimed is:

1. A system to transport a set of took to a series of job sites, and to secure and manage the set of tools at each job site, wherein said system comprises:

a unitary portable tool storage building comprising a shipping container, said shipping container configured to be transported between job sites over a common public road, wherein said unitary portable tool storage building comprises:

a container floor;

a container top wall opposite said container floor;

a spaced pair of container sidewalls disposed in opposition, said pair of container sidewalls extending from said container floor to said container top wall, said pair of container sidewalls joined in fixed integral relationship therewith;

a pair of container minor ends defined between said pair of container sidewalls, said container floor and said container top wall at opposite ends thereof;

a container interior defined by cooperation of said pair of container sidewalls, said container floor, said container top wall, and said pair of container minor ends, a container exterior opposite said interior, said container exterior defined by cooperation of respective outer surfaces of said pair of container sidewalls, said container floor, said container top wall, and said pair of container minor ends, said container exterior facing an external environment outside said unitary portable tool storage building;

a plurality of tool bay dividers subdividing the interior, cooperation of said plurality of tool bay dividers defining a plurality of tool bays;

a plurality of tool bay door portals, defined in at least one of said container sidewalls and container minor ends;

wherein each tool bay door portal defining a corresponding tool bay access control point aligned with a corresponding one of said plurality of tool bays to provide a single route of entry and egress by authorized personnel between the external environment and said corresponding one of said plurality of tool bays;

a plurality of tool bay doors corresponding to said tool bay door portals, each tool bay door supported for access control movement relative to a corresponding tool bay door portal between an open position and a dosed position, in said open position said tool bay door allowing access to said tool bay from said external environment through said corresponding tool bay door portal, in said dosed position said tool bay door preventing access to said tool hay from said external environment through said corresponding tool bay door portal;

a plurality of door access control mechanisms corresponding to said tool bay doors, each door access control mechanism configured to selectively control said access control movement of a corresponding tool bay door;

wherein each of said tool bays further subdivided to provide a plurality of tool storage locations;

wherein each of said plurality of tool storage locations configured to store a corresponding one of said plurality of tools; and wherein during regular operation, each tool storage location accessible from a corresponding one of said tool bay door portals that defines a corresponding tool bay access control point aligned to provide said single route of entry and egress to one corresponding tool bay including the same tool storage location;

a self-service kiosk subsystem mounted in said shipping container, wherein said self-service kiosk subsystem comprises:

a display configured to display access information to personnel accessing said self-service kiosk subsystem;

an image data input device to capture image data of personnel accessing said self-service kiosk subsystem, said self-service kiosk subsystem configured to capture secondary identification data of personnel accessing said self-service kiosk subsystem, and said self-service kiosk subsystem configured to enable login operations in relation to personnel lacking authorization for tool bay access operations;

a distributed wireless tool locating subsystem wherein said distributed wireless tool locating subsystem comprises:

a plurality of wireless identification sources associated with corresponding each one of the set of tools, the plurality of wireless identification sources each providing wireless tool identification data associated with said corresponding each one of said set of tools over a wireless communication mode, and a wireless receiver configured to process said wireless tool identification data, and a tool location processing module to process said wireless tool identification data to determine locations of each one of said set of tools; and at least one processor configured to perform the following:

receiving captured image data of personnel from said image data input device, processing said captured image data of personnel received from said image data input device, receiving personnel credentials data input from a data input device of said self-service kiosk subsystem, accessing a data storage comprising personnel identification data, retrieving from said data storage personnel identification data in relation to at least one of said captured image data and said personnel credentials data input, verifying identity of personnel using said self-service kiosk subsystem based on processing said captured image data and personnel credentials data input, outputting system usage information to said display, performing tool access rules in relation to said identity, determining authorization for personnel to access tools in relation to performing said tool access rules, generating access control instructions to cause operation of said plurality of door access control mechanisms to provide authorized access to tool storage locations, performing on the fly tool inventory calculations, performing on the fly tool location audits, generating a report of tool locations and status for all took in the set of tools, generating tool return prompts to personnel, issuing exclusive authorization to identified authorized personnel to access at least one tool storage location to remove at least one pre-identified tool, performing an automated real-time audit of location of all took after removal of the at least one re-identified tool but before authorized personnel is issued release authorization to depart from said tool storage building, reporting the automated real-time audit to supervisory personnel to prompt intervention before authorized personnel is issued release authorization to depart from said tool storage building, and issuing, based on the performed automated real-time audit, release authorization for authorized personnel to depart from said tool storage building.

2. The system according to claim 1, wherein said data input device comprises said image data input device.

3. The system according to claim 1, wherein said data input device comprises a secondary data input device other than said image data input device.

4. The system according to claim 2, wherein said secondary identification data comprises personnel identification card data.

5. The system according to claim 1, wherein said system further comprises:

a photo cell configured to detect presence of personnel at said self-service kiosk subsystem.

6. The system according to claim 1, wherein said system further comprises:

an anti-gaming security subsystem configured to detect presence within a security perimeter at said unitary portable tool storage building of an unauthorized person other than the single person for whom access authorization is determined.

7. The system according to claim 6, wherein responsive to an access termination condition being satisfied, said anti-gaming security subsystem terminating access of said authorized personnel.

8. The system according to claim 1, wherein said image data input device comprises a security camera trained on personnel using said self-service kiosk subsystem.

9. The system according to claim 1, wherein said system further comprises:

at least one security camera trained on each of said plurality of tool bays to record video data of took in possession of personnel accessing each of said plurality of tool bays.

10. The system according to claim 1, wherein said real-time audit determines all took removed from any tool storage locations accessible to said authorized personnel during an authorized access period immediately preceding the real-time audit.

11. The system according to claim 1, wherein said processor is further configured to selectively control access to plural of said tool storage locations to provide the real-time audit to determine all took removed from any tool storage locations through a tool bay door portal during the period the identified authorized personnel is issued exclusive authorization to remove pre-identified tools.

12. The system according to claim 1, wherein said processor is further configured to selectively control access to plural of said tool storage locations to provide the real-time audit to determine all took moved from a resting position in any tool storage locations during the period the identified authorized personnel is issued exclusive authorization to remove pre-identified took.

13. The system according to claim 1, wherein said processor is further configured to issue exclusive authorization to identified authorized personnel, responsive to usage of the self-service kiosk subsystem by said personnel to gain issuance of said authorization, to access at least one tool storage location to remove at least one pre-identified tool.

14. The system according to claim 1, wherein said processor is further configured to access geofence information in relation to a tool.

15. The system according to claim 1, wherein said system comprises:

a tool bay door sensor configured to provide an open signal when a corresponding tool bay door is positioned other than in the dosed position.

16. The system according to claim 1, wherein said processor is further configured, responsive to said real-time audit of said set of tools, to provide a control signal to cause a tool bay door to move from a first position to a second position.

* * * * *